United States Patent [19]

Meunier

[11] 4,265,750
[45] May 5, 1981

[54] BAR SCREEN FILTERING DEVICE

[76] Inventor: Gabriel Meunier, 6290 Rue Perinault, Montreal, Quebec, Canada, H4K 1K5

[21] Appl. No.: 62,703

[22] Filed: Aug. 1, 1979

[51] Int. Cl.³ .................... B01D 29/38; B01D 35/02
[52] U.S. Cl. .................................. 210/159; 210/170
[58] Field of Search .............. 210/153, 154, 158, 159, 210/162, 170; 405/80, 81, 83

[56] References Cited

U.S. PATENT DOCUMENTS

| | | | |
|---|---|---|---|
| 1,529,602 | 3/1925 | Maine | 210/160 |
| 1,794,504 | 3/1931 | Van Norman | 210/162 |
| 2,128,347 | 8/1938 | Briggs | 210/162 |
| 2,128,349 | 8/1938 | Briggs | 210/162 |
| 2,198,943 | 4/1940 | Lowe | 210/162 |
| 2,915,184 | 12/1959 | Lannert | 210/158 |
| 3,872,006 | 3/1975 | Abel | 210/158 |

Primary Examiner—Theodore A. Granger

[57] ABSTRACT

The specification discloses a bar screen in combination with apparatus adapted to clean the same by inserting a rake between the bar screen and moving the rake upward. The bar screen comprises a plurality of bar members each having a base component adapted for securement to the bed of the waste waterway and an upright component integrally attached to the base component to form an approximate "L" shaped bar member. The bar members are sized and spaced apart with the base component extending upstream to provide a protected area free of large debris for insertion of the rake means in preparation for the cleaning operation. Such a combination minimizes the possibility of rake damage and increases the cleaning efficiency of the unit.

2 Claims, 3 Drawing Figures

BAR SCREEN FILTERING DEVICE

FIELD OF THE INVENTION

This invention relates to bar screens used to filter solid substances commonly carried in the liquids of waste waterways or sewage drainage canals.

BACKGROUND OF THE INVENTION

In the past, various devices have been proposed for cleaning and maintaining bar screens in suitable operating condition. It is important that screens remain clean to ensure the waterway does not become obstructed due to material accumulating on the bar screen. If such accumulation does occur, the waste waterway may back-up and cause flooding of the upstream area. In order to minimize this occurance, a number of automatic cleaning devices have been proposed that are timed to clean the bar screen on a regular basis. In a number of these devices, such as that disclosed in Canadian application Ser. No. 213,050; a rake member is inserted through the bar screen and projects beyond the bars, such that when it is drawn upward, any accumulated material on the bar members is removed. However, if large objects have accumulated at the base of the bar screen the rake is prevented from being fully inserted through the bar screen. This prevents the rake from cleaning the full height of the bar screen and the large objects remain at the base of the screen. Furthermore, depending on the exact design of the cleaning apparatus damage to the rake may occur when large objects are encountered.

The present invention is designed to overcome a number of the problems of the prior art systems by providing a modified bar screen that minimizes the problems caused by large objects.

SUMMARY OF THE INVENTION

The present invention provides an improved bar screen for use in filtering a liquid in a waste waterway. This screening device is used in conjunction with a device designed to clean the bar screen which includes a rake means which is inserted between the bar members of the screen and drawn upward to clean these members. The bar screen comprises a plurality of members having a base component adapted for securement to the bed of the waste waterway and an upright component attached to the base component to form an approximate L shape. These bar members are spaced apart and positioned across the waste waterway to provide a screening device for filtering solid components from the liquid. The screening device is orientated in the waterway to provide a protected area free of large debris allowing the rake means to be inserted between the bar members during the cleaning cycle.

According to another aspect of the invention, the upper edge of the base component of the bar screen is at the approximate level of the portion of the bed of the waterway immediately upstream of the cleaning system, and the bed of the waterway immediately downstream of the cleaning system is lower. A height differential is established across the bar screen and the base component of the bar functions as an additional screening surface.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
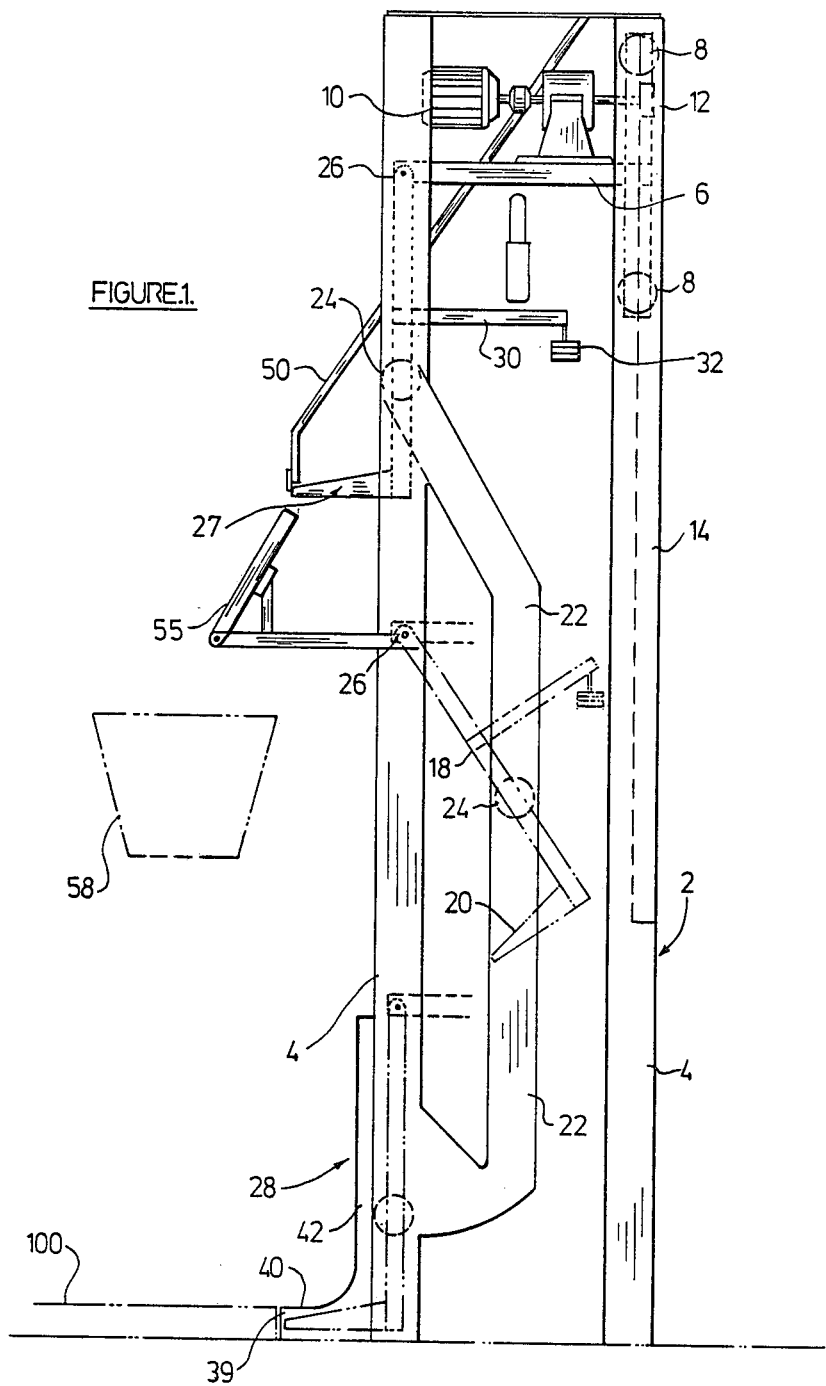
FIG. 1 is a side elevation of the bar screen and cleaning apparatus.

The cleaning apparatus as shown comprises a main frame 2 having four upright guide channels 4 positioned rectangularly. A-T shaped motor carriage member 6 is adapted with wheels 8 which work in conjunction with the U-shaped guide members 4 to allow the carriage to move vertically within the main frame. A motor 10 is secured to the carriage and drives a pinion gear 12 which works in conjunction with the rack 14 for positioning the carriage within the main frame.

Pivoted to the outer periphery of the T member 6 is the rake 27. The rake comprises vertical members 18 and a number of finger members 20. A rake positioning channel 22 works in conjunction with the wheel supports 24, journaled a distance below the pivot connection 26 which secures the vertical support member of the rake 18 to the carriage 6. This rake guide channel 22 allows the rake to be moved rearwardly away from the forward guide channels 4 and behind the bar screen 28. As the carriage continues to move downward, the rake reaches the bottom portion of the guide means 22 and is urged forward between the individual bars of screening member 28 due to the influence of gravity. This pivoting of the rake forward is enhanced due to the lever arm 30 and weights 32 which are secured to vertical members 18. Therefore, as the wheels 24 reach the lower portion of the guide means 22 the rake swings forward and between the bar members of the screen 28.

As can be seen in FIG. 1, each bar member is essentially L shaped, and comprises a base component 40 and an upright component 42. The base component 40 has a height that is sufficient to ensure that the finger members 20 of the rake are inserted between the base components 40 and below the upper surface of the base component. After the rake is positioned between the bar members, the carriage is advanced upwardly and the rake is drawn upwardly between the bar members and material on the screening device is raised with the rake member. The rake member continues its ascent upwardly following the forward guide channels 4 and any swinging of the rake is limited due to the wheel support 24 interacting with the guide channel 4. As the rake continues upwardly it encounters a wiper 50 which interacts with the fingers of the rake member to remove debris. The wiper is hinged near the back of the frame and is advanced over the fingers as the rack moves upward. The debris is pushed towards a chute member 55 and subsequently, to a retaining bin 58. Within the rake guide means 22 is a flap member 62 which is hinged such that the rake follows the guide member 22 on descent and pushes the flap member back as the rake is advanced to its upper vertical position. Futher details of the operation of the cleaning mechanism are disclosed in copending Canadian application Ser. No. 213,050.

Figure 2:
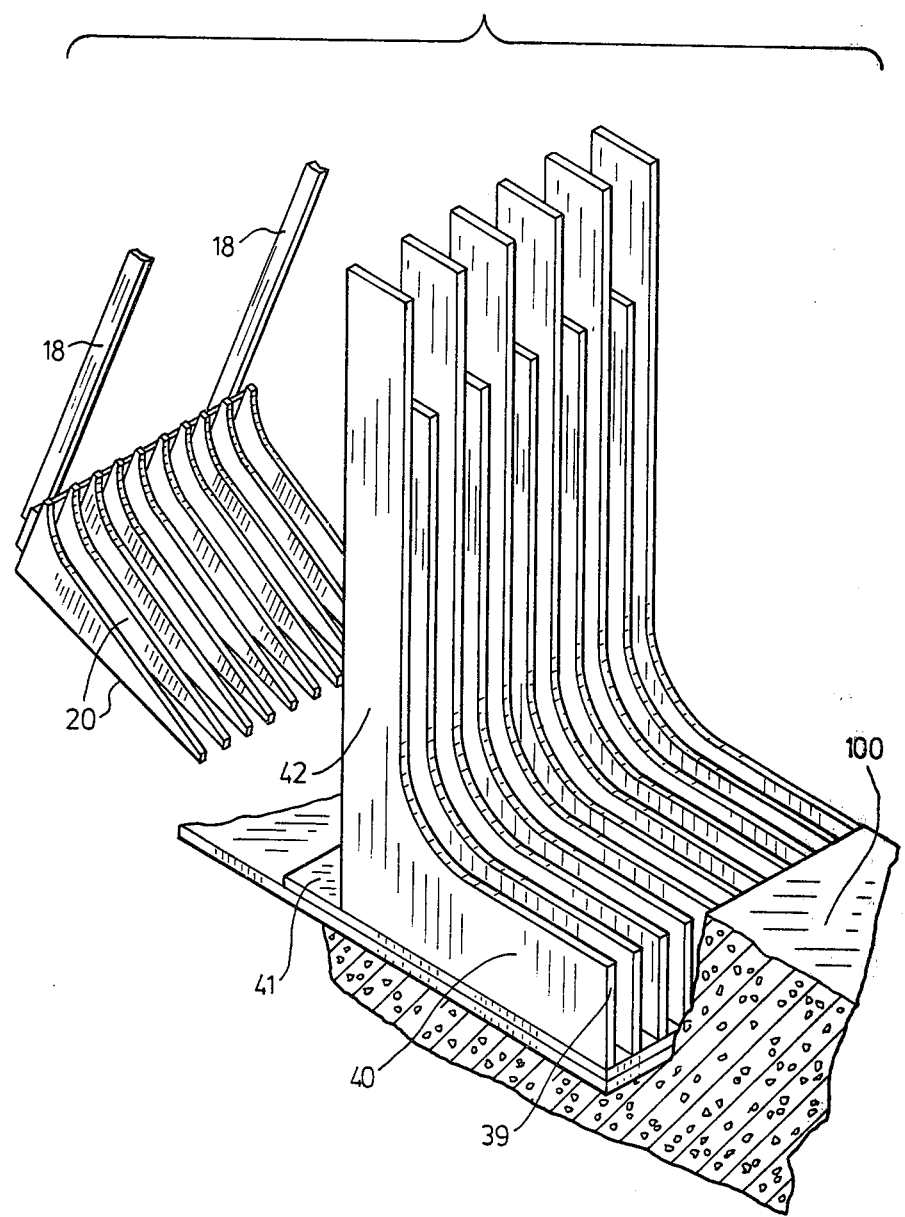
FIG. 2 is a perspective view of the bar screen and rake of the cleaning apparatus.

As shown in FIGS. 1 and 2, the L shaped bar members are spaced across the waterway and are aligned to allow the fingers 20 of the rake to be inserted between the bars. The exact width of the bar screen will vary according to the width of the waste waterway and the various design considerations of the waste waterway, i.e., flow rate, expected occurance of solids, etc. As shown, the blunt end 39 of base component 40 is positioned upstream such that the water flows across the base component prior to contacting the upright portion. This arrangement increases the submerged working surface and the efficiency of the device. The upper surface of the base component provides a grate to support the accumulation of large or heavy debris and as such provides a protected area below the upper surface of the base component such that the fingers of the rake may be inserted between the bars.

In a preferred embodiment of the invention, the base component has been recessed in the bed of the waterway 100 such that the upper surface of the base component 40 and the bed of the waterway immediately upstream are at approximately the same level. Furthermore, the portion of the waterway downstream of the screening member is lower such that the bed of the waterway is essentially at the level of the lower portions of the base component and as such provides both a grate for supporting large material and additional filtering surfaces due to the drop across the screening device.

It is understood that the spacing between bars will be a function of the material to be filtered and can be varied accordingly. It can further be appreciated during low levels of liquid in the waterway the flow will accelerate due to the drop across the bar screen, and as such may tend to flush out any material that is located between the base components of the bar screen. Although the accumulation of small material does not present a significant problem when the rake means is inserted, this flushing action does provide a useful function in that accumulation of material may increase the possibility of corrosion of the bar components.

The screening device can be secured to the base of an existing waterway without providing this step profile. For example, the bar screens could be set on the bed of a waste waterway with the base component of each bar member providing a support grate for large objects. In this case, the upstream portion of the base component could be adapted with a tapered end to provide a somewhat smooth transition from the bed of the waterway to the upper surface of the base component. The base component would still provide a protected area such that the rake fingers may be easily inserted.

According to a preferred embodiment, the upright component is not vertical and is angled slightly upstream. This orientation of the upright component assures the rake 16 does not bind as the rake is advanced upwardly.

It is also possible for the upstream edge of the vertical component to be angled slightly downstream from the vertical, thus assuring the extension of the finger members of the rake is constant or increasing during the cleaning operation. Thus as more debris is encountered the surface area of the finger members is increasing, minimizing the possibility of debris falling off the finger means.

According to FIG. 2, the bar members may be fastened by a common plate 41, at the lower extreme of the base members with the plate subsequently secured in the waterway. However, it is also possible for the bar members to be installed individually when waterway is being poured, and as such will be anchored within the concrete.

Figure 3:
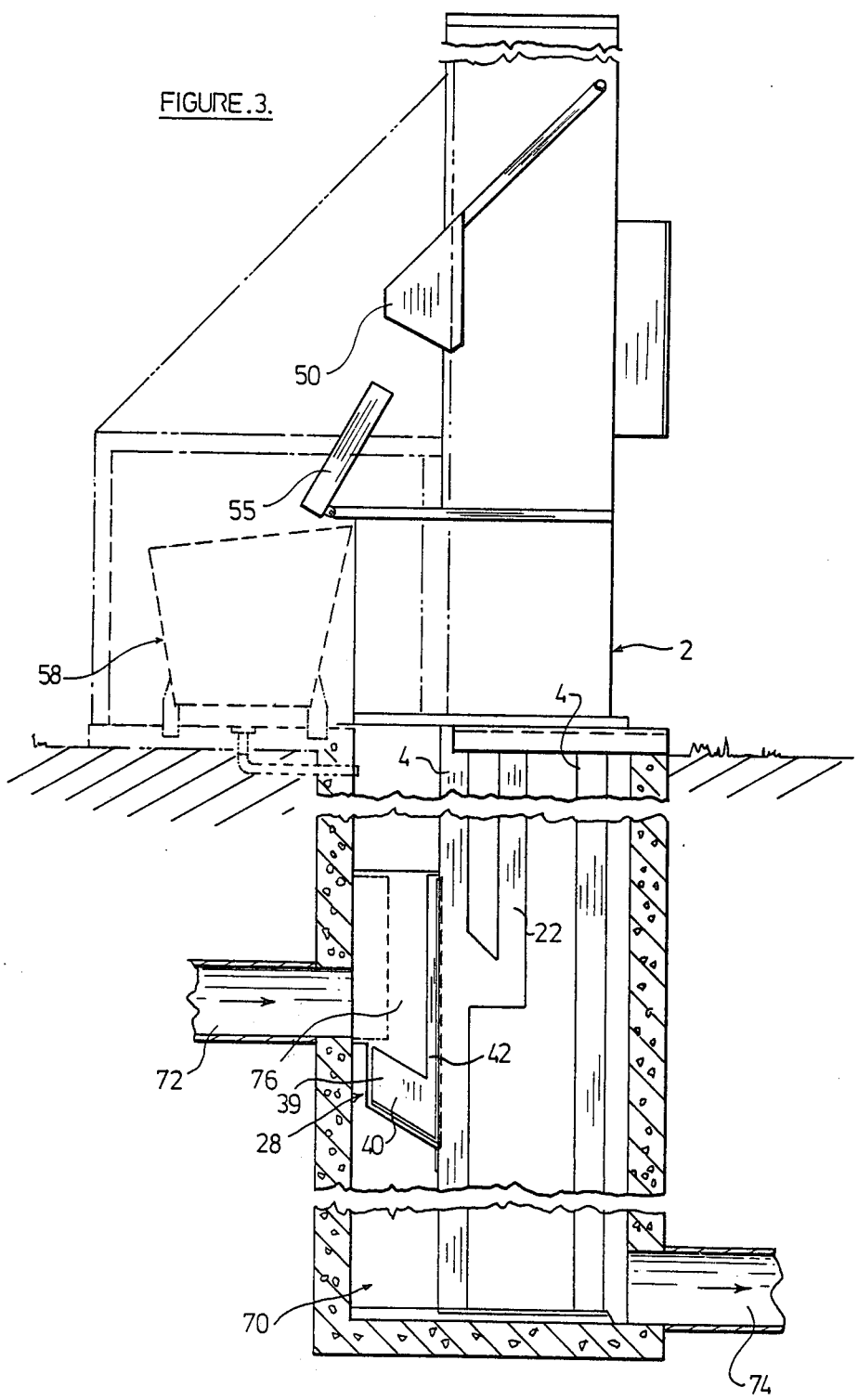
FIG. 3 is a sectional view of the bar screen adapted for use in a manhole.

This device may also be used in filtering a liquid entering a manhole as shown in FIG. 3. In this case, the water enters the manhole 70 via conduit 72 and contacts the bar screen 28. Depending on the velocity of the liquid, it will pass through the upright components 42 or the base components 40. The filtered liquid then leaves the manhole through conduit 74.

According to this application, the base component may be oriented to form an acute angle with the upright component thereby urging filtered material to accumulate adjacent the juncture of these components. As in the previously described applications of the device, the bar screen provides a protected area for easy insertion of the rake during the cleaning cycle as well as providing an increased filtering surface. Side plates 76 assure the liquid passes through the screening device.

The exact width of the screening member will depend on the application of the device, however, it normally will be designed to transverse the width of the waste waterway and filter the entire stream. As shown in FIG. 2, there are a number of upright components of reduced height, providing an emergency overflow mechanism should a major portion of the screening device become clogged with debris or for storm runoff. Therefore, it is not necessary to provide an emergency divergent channel around the filtering member, however, in some applications, this also may be desirable.

The particular design of the bar screen members may vary, however, they provide a protected area to allow the rake to be inserted between the bar members. This particular structure allows the rake means to be inserted without encountering a large object, while also allowing the rake means to possibly remove these large objects.

In prior art devices, vertical bar members have been used, however, it can be appreciated as material accumulates against these bar members, a considerable force is exerted on these members due to the water flow striking this restriction. The design of the present system distributes the moment caused by this force over the length of the base component, and as such, provides a more stable structure.

Although various embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A bar screen and cleaning mechanism in combination with a waste waterway for filtering and removing waste from the waterway comprising a plurality of bar members spaced across the width of the waterway, each bar member having a base component securable to and extending above the bed of the waterway and a free standing upright component extending from said base component to form an approximate L-shaped bar member with the free end of the base component being upstream of said upright component when secured in the waterway, said cleaning mechanism including a rake means and rake guide means, said rake means having a plurality of bar projections spaced for insertion between said base components, said guide means cooperating with said rake means to insert said bar projections from the downstream side of said screen between said bar members adjacent the bed of the waterway and below the upper surface of said base components in preparation for cleaning of said screen and subsequently, allowing said rake means to be drawn essentially vertically upward whereby, said bar projections extend through said upright components and lift waste accumulated on the upstream side of said screen with the movement of said rake means.

2. A bar screen in combination with a sewer manhole, having a water inlet conduit comprising a plurality of bar members, each bar member having a base component and an upright component attached to said base component to form an approximate "L" shaped bar member, said bar members being spaced apart and positioned upright within the manhole across the manhole inlet conduit with said base components below said inlet conduit, and secured to said sewer manhole along the lower edge of the base component, said upright component free standing from the base component and spaced from said inlet conduit by said base component whereby the base component of said bar screen provides a protected area free of large debris between said base components for insertion of a rake from the downstream side of said screen in preparation for the cleaning of the screen.

* * * * *